March 21, 1950
E. A. KRUSE
2,501,607
ROLL FORMING APPARATUS
Filed Oct. 8, 1946
4 Sheets-Sheet 1
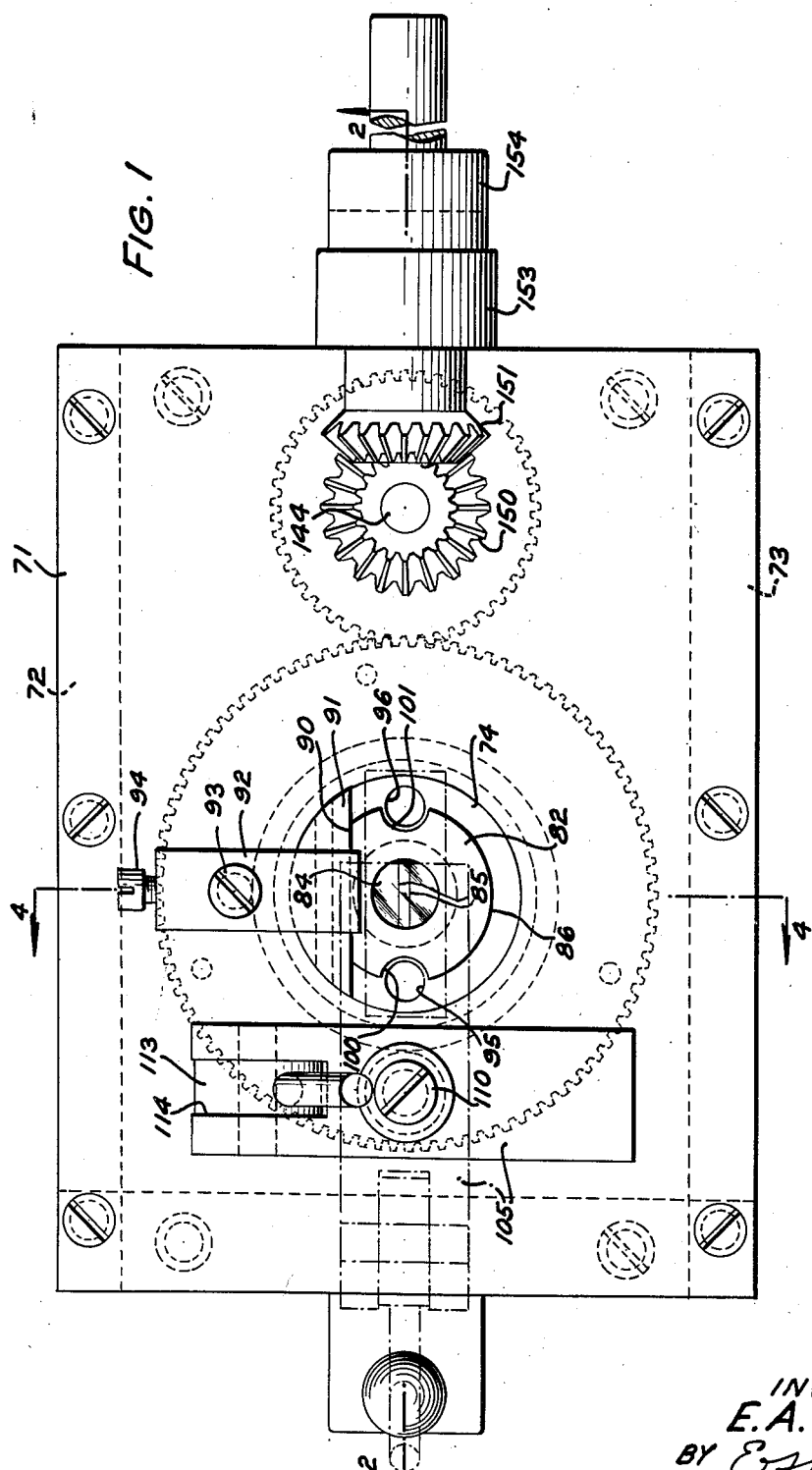
INVENTOR
E. A. KRUSE
BY E. F. Kane
ATTORNEY March 21, 1950 — E. A. KRUSE — 2,501,607
ROLL FORMING APPARATUS
Filed Oct. 8, 1946 — 4 Sheets-Sheet 2
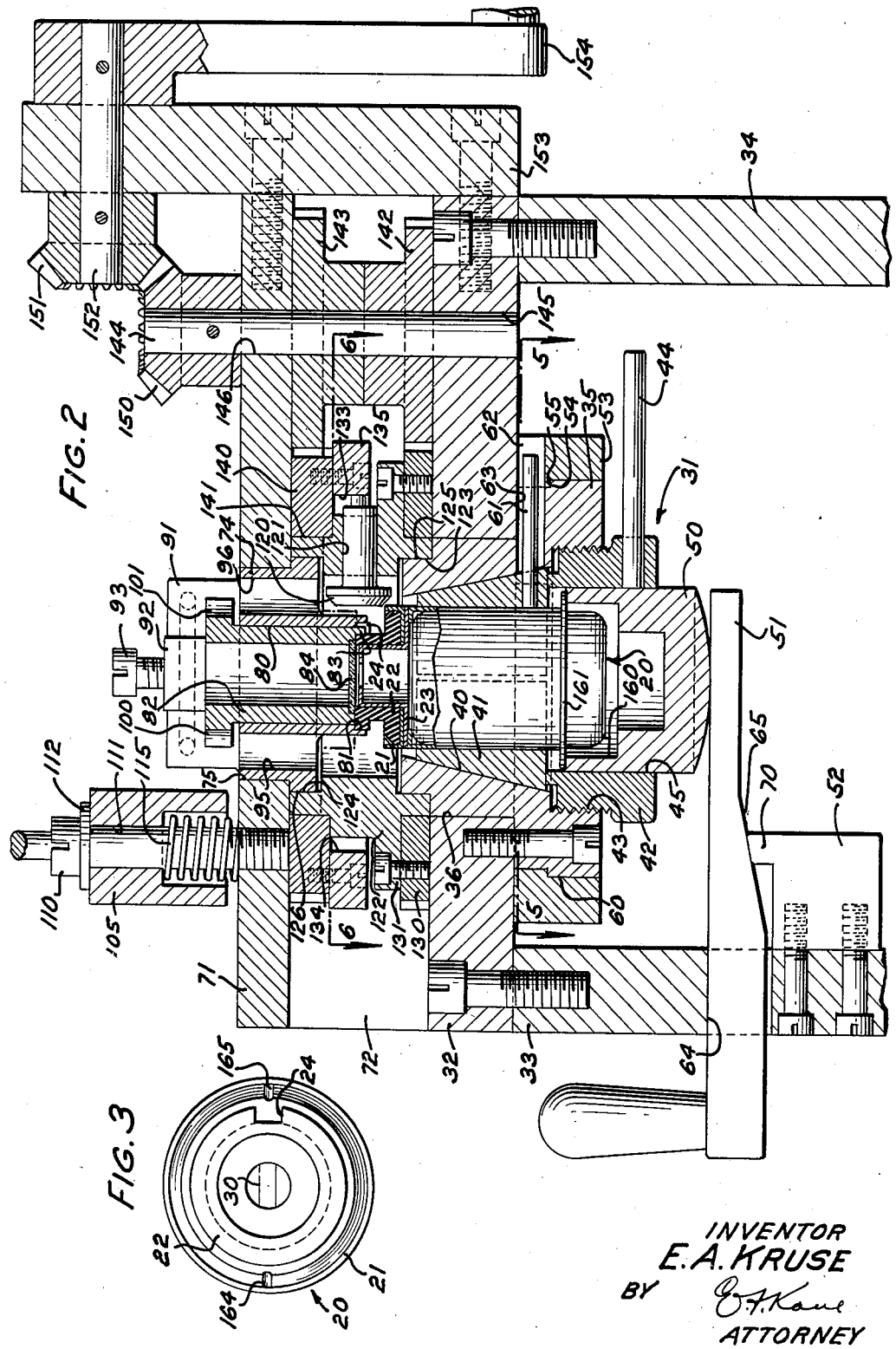
INVENTOR
E. A. KRUSE
BY
ATTORNEY

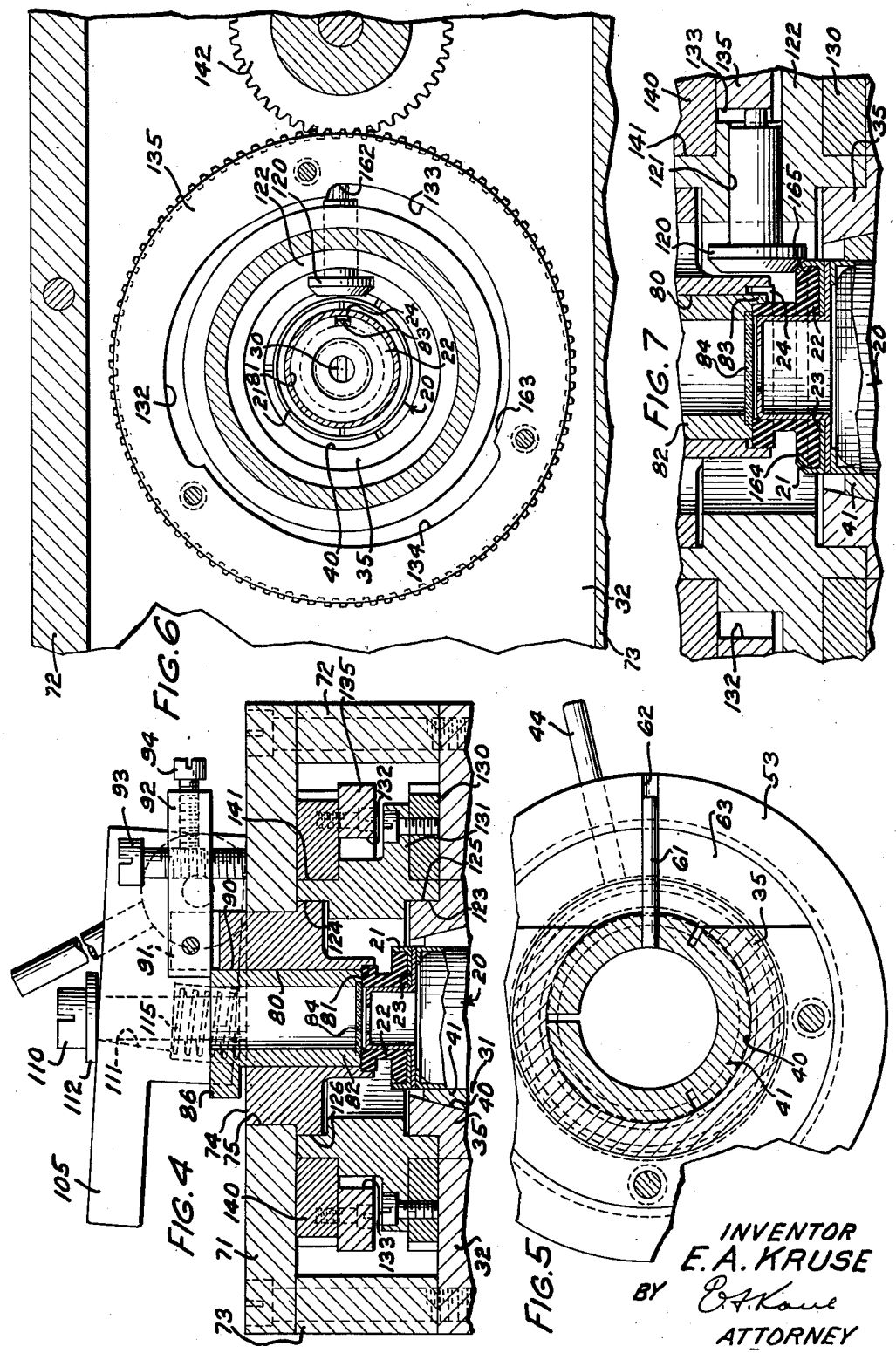

March 21, 1950     E. A. KRUSE     2,501,607
ROLL FORMING APPARATUS
Filed Oct. 8, 1946     4 Sheets-Sheet 4
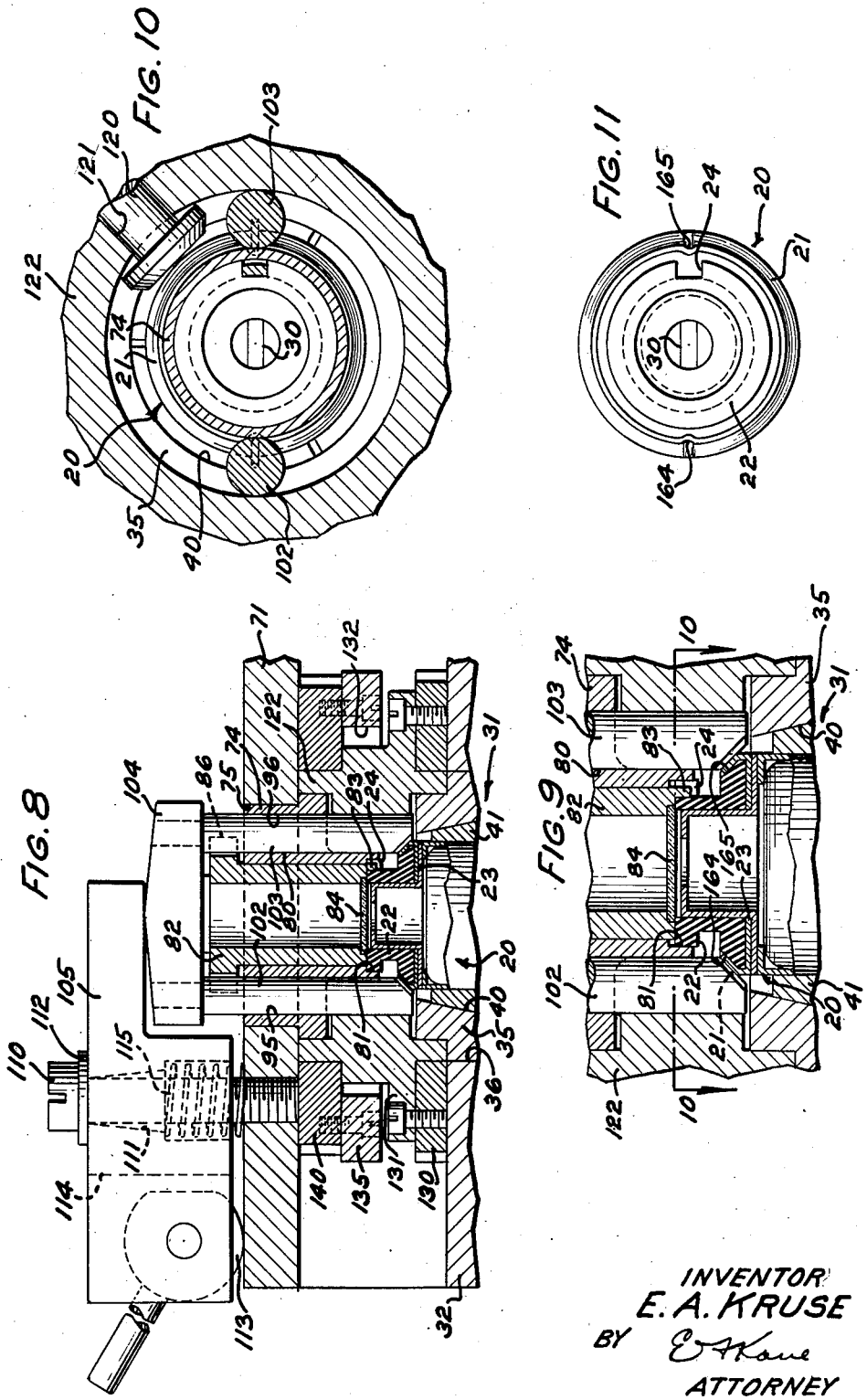
INVENTOR
E. A. KRUSE
BY E. F. Kane
ATTORNEY Patented Mar. 21, 1950

2,501,607

UNITED STATES PATENT OFFICE 2,501,607

ROLL FORMING APPARATUS

Eugene A. Kruse, Downers Grove, Ill., assignor to Western Electric Company, Incorporated, New York, N. Y., a corporation of New York Application October 8, 1946, Serial No. 701,961

4 Claims. (Cl. 153—1)

This invention relates to a roll forming apparatus and more particularly to an apparatus for roll forming the edge of an annular skirt over an insert.

In the manufacture of certain high frequency apparatus, it is necessary to secure an annular plastic part within certain circular confines bounded by a short annular skirt, the edge of which is bent inwardly around its entire perimeter to secure the plastic part therein. Hammering or punching were not feasible because of the brittleness of the plastic part, and an apparatus for non-percussive deformation of the skirt edge had to be devised.

It is an object of this invention to provide a new and efficient apparatus for accurately angularly displacing an annular edge.

In accordance with one embodiment of this invention, an apparatus is provided with a stationary circular chuck for holding a circular skirted work part, the circular edge of which is to be bent inward by rolling it down. A rolling tool radially and rotatably mounted on a ring gear surrounding the work part is gradually forced radially inward by a camming surface formed on a gear rotating about the same axis as the ring gear but with a differential movement therebetween. A plastic part confined by the bent edge is further secured by crimping the edge into notches formed in the part.

A complete understanding of the invention may be had by reference to the following detailed description taken in conjunction with the accompanying drawings, in which Fig. 1 is a plan view of a preferred embodiment of the invention with the crimping tool removed and showing part of the driving mechanism;

Fig. 2 is a front cross-sectional view of the apparatus shown in Fig. 1 and taken on the line 2—2 of that figure. Practically the entire apparatus is shown in cross-sectional detail in this figure;

Fig. 3 is a plan view of the parts to be assembled by rolling an edge on one of them;

Fig. 4 is a cross-sectional view of the apparatus illustrated in Fig. 1 and taken on the line 4—4 of that figure;

Fig. 5 is a view partly in section taken on the line 5—5 of Fig. 2 to show the details of the manual control for turning the work part about its axis to properly align it;

Fig. 6 is a part-sectional view of the apparatus taken on the line 6—6 of Fig. 2. This view shows the contour of the cam surfaces on the cam gear and the relationship between the rolling tool and the cam surfaces;

Fig. 7 is a detail view illustrating the rolling tool cammed into contact with the skirt edge which is shown in this figure completely rolled down;

Fig. 8 illustrates the means for forcing the crimping tool against the rolled skirt edge;

Fig. 9 is a view showing the ends of the crimping tool forced against the rolled skirt;

Fig. 10 is a sectional plan view taken on the line 10—10 of Fig. 9 to illustrate the relative position of the twin posts of the crimping tool with respect to the other parts of the apparatus; and Fig. 11 is a plan view of a completely assembled, rolled and crimped work piece.

As will be seen from the drawings, the preferred embodiment of the invention is admirably suited for operating on a vacuum tube part 20 of generally tubular structure having a short skirt 21 which when angularly displaced inward serves to hold in place a plastic cap 22 between the inwardly bent skirt edge and an inwardly extending annular shoulder 23 which is part of the structure of the tube part. The details of the interior of the tube part are not of particular interest here except that the cap 22 has a notch 24 which must be in alignment with a rectangular wave guide 30 disposed within the tube part 20, (Figs. 3, 10 and 11).

While being worked upon, the tube part 20 is held in a circular chuck 31 mounted on a relatively heavy horizontal plate 32 which is firmly secured to frame members 33 and 34. The chuck 31 comprises an irregularly shaped circular block 35 extending through and securely fixed in an aperture 36 formed in the plate 32. A frustoconical aperture 40 formed in the block 35 accommodates a tapered split collar 41 which is contractible upon the application thereto of upwardly applied pressure furnished by a threaded collet 42 screwed into a threaded extension 43 of the lower end of the frusto-conical aperture 40. For added leverage and convenience, the collet 42 is provided with a lever 44. An aperture 45 in the collet 42 provides a convenient opening through which the tube part 20 may be inserted so that it may be gripped by the tapered collar 41. A circular plug 50 adapted to slideably fit the aperture 45 and locked in place by cooperative locking members 51 and 52 is adapted to prevent downward displacement of the tube part 20 while it is being properly positioned in the apparatus. The tube part 20 may be rotated to the proper position by rotating a collar 53 having an inner annular shoulder 54 which shoulder rides on a shoulder 55 around the peripheral surface 60 of the block 35. Turning the collar 53 moves a short rod 61 which at one end is fastened in the base of the split collar 41, the other end being disposed within the confines of a slot 62 formed in the collar 53. A portion of the block 35 is cut away to form a space 63 through which the rod 61 may be moved. The locking member 51 is slideably disposed in an aperture 64 formed in the upright 33, the aperture being slightly larger than that left end of the locking member (Fig. 2). A camming surface 65 formed on the locking member 51 is adapted to cooperatively engage a cam 70 which is an integral part of the locking member 52. Thus upon horizontal manipulation of the locking member 51 will either force a tube part 20 vertically into position or permit its removal.

Directly above the plate 32 and in a plane parallel thereto, another plate 71 is mounted on a pair of blocks 72 and 73 at opposite ends of the plate 32 which blocks together with the plate 71 and the plate 32 form a solid structure. An irregular shaped circular insert 74 is secured in an aperture 75 formed in the plate 71 and coaxial of the aperture 36. The insert 74 is provided with a central aperture 80 having a slight enlargement 81 at its lower end to accommodate the peripheral edge of the upper part of the cap 22 when a tube part 20 is clamped in the chuck 31. Slideably disposed in the central aperture 80 is a sleeve 82 having a small locating key 83 extending from its lower circular edge and adapted to engage the slot 24 in the cap 22 when properly aligned.

A transparent disc 84 (Figs. 2 and 8) having hair lines 85 (Fig. 1) inscribed thereon is secured to the lower end of the sleeve 82 to facilitate the alignment of the wave guide 30 with the notch 24. To hold the sleeve 82 against rotation, an annular flange 86 at the upper end of the sleeve is interrupted to provide a straight edge 90 (Fig. 1) which abuts a bifurcated vertical extension 91 of the insert 74. The length of skirt or tubular edge which will be rolled by this apparatus is determined by the degree of upward displacement of the sleeve 82 permitted by the position of the left end of an adjustable lever 92 pivoted between the tines of the bifurcated extension 91 (Fig. 4). Variable adjustment is provided by a bolt 93 threaded into the other end of the lever and the bolt may be locked at any chosen position by a set screw 94. A pair of diametrically opposite apertures 95 and 96 in the block 74 and semi-circular cutouts 100 and 101 in the flange 85 slideably accommodate the legs 102 and 103 of an inverted U-shaped crimping tool 104, which may be forced downward by a lever 105 rotatable and slideable on a bolt 110 that passes through a tapered aperture 111 and is screwed into the plate 71. The fulcrum of the lever is a washer 112 between the head of the bolt 110 and the upper surface of the lever 105. Force is applied to the left end of the lever (Fig. 8) by a manual lever-operated eccentric 113 pivoted in a slot 114 formed in the end of the lever 105. A substantially universal movement at the fulcrum is provided by virtue of the tapered aperture 111 the lower end of which is enlarged to accommodate a helical spring 115 which resiliently urges the lever against the washer 112.

The rolling mechanism is located between the plates 71 and 32 and the structure is such that between limits a rolling tool 120 travels in a radially decreasing orbit around an imaginary central axis projected through the sleeve 82 and the chuck 31. The rolling tool is rotatably mounted and freely movable on its longitudinal axis within an aperture 121 formed on one of the radii of an irregular shaped hollow circular member 122 which is so disposed between the plate 71 and 32 that inside peripheral surfaces 123 and 124 fit over and slideably engage the peripheral surfaces of circular extensions 125 and 126, on the members 35 and 74, respectively, to permit rotation of the member 122 around its central axis. A ring gear 130 is secured to the lower end of the circular member 122 and is fitted against an annular shoulder 131 formed in the member 122 so that the bottom surfaces of the member 122 and of the ring gear 130 are flush and slideably engage the upper surface of the plate 32.

The rolling tool 120 is progressively forced radially toward the center of orbital rotation by any one of a series of camming surfaces 132, 133 and 134 (Fig. 6) on a ring 135 rotating around the central axis in a path parallel to that of the circular member 122 but slightly faster than that member thereby producing a differential movement between the rolling tool traveling around the central axis and the camming surfaces. The cam ring 135 is secured to a ring gear 140 which is rotatably mounted on a shouldered peripheral surface 141 along the upper portion of the circular member 122. Gears 130 and 140 are driven by gears 142 and 143, respectively, fixed to a shaft 144 which is journalled in the plates 71 and 32 and 145 and 146.

A beveled gear 150 at the upper end of the shaft 144 is engaged by another beveled gear 151 fixed to a shaft 152 journaled in an upright member 153 and may be rotated by a manually operable crank 154 fixed to the other end of the shaft 152. It will be apparent that when the crank is operated the gears on the shaft 143 will be rotated thereby driving the ring gears 130 and 140. For the apparatus to operate properly there must be a difference in the number of teeth between the two ring gears and also between their respective driving gears so that the result will be a differential movement between the ring gears, the upper ring gear 140 moving slightly faster than the lower ring gear 130. For example, the gears may be designed so that when the upper gear 140 makes one revolution, the lower gear 130 will make 95/96 of a revolution thereby providing a differential of one part in 96 at the end of each revolution.

In the operation of the apparatus, the locking member 51 is first grasped by the handle and pulled to the left (Fig. 2) to permit removal of the circular plug 50 from the chuck 31 after which a tube part 20 is placed in a cavity 160 formed in the plug 50 so that a flange 161 on the tube part 20 rests on the cavity rim. The plug and the tube part are then inserted into the aperture 45 until the upper part of the tube part extends through the split collar 41 and the plastic cap 22 fits into the enlargement 81 of the aperture 80 in the insert 74. Next, the cap 22 is oriented by turning the plug 50 and with it the tube part 20 until the notch 24 in the cap 22 is aligned with and engaged by the key 83 on the sleeve 82.

In the meantime, the sleeve 82 should be limited to a predetermined height by adjusting the lever 92 with the bolt 93. Since the cap 22 abuts the end of the sleeve 82, the height of the sleeve will determine the length of skirt edge that will be rolled over. When the cap 22 has been properly aligned, the tube part 20 is held against rotation by tightening the collet 31 thereby contracting the split collar 41 around the tube part. Figure 6 shows the tube part and the relative position of the rolling tool and the cam surfaces at the start of the rolling operation. The crank 154 is then operated imparting motion to the shaft 144 thereby driving the gears 130 and 140. While the gears 130 and 140 are rotating, the differential movement therebetween causes the cam surfaces to move relative to the right end of the rolling tool (Fig. 6) thereby gradually and progressively advancing the rolling tool radially inward while the rolling tool is carried around the tube part 20 by the member 122. For example, the cam surface 133 moves from a point 162 to a point 163 (Fig. 6). Thus the edge 21 will be gradually bent inward without the danger of cracking the cap 22.

After the edge 21 has been rolled down, the tube part 20 is loosened slightly by relieving a part of the pressure on the tapered collar 41, and the wave guide 30 is aligned with respect to the notch 24 by turning the collar 53 until the hair lines on the transparent disc 84 are in line with a wave guide 30, after which the tube part is again securely clamped. The crimping tool 104 is then placed in position by inserting the legs 102 and 103 into the apertures 95 and 96 (Figs. 8, 9 and 10). Pressure is then applied to the yoke of the crimping tool by means of the lever 105 which should be swung from the position shown in solid (Fig. 1) to the dot and dash position of the same figure. The tube part 20 and the crimping tool 104 are so aligned that when pressure is applied, the rolled skirt edge 21 is crimped directly over notches 164 and 165 formed in the base of the cap 22. The crimp permanently maintains the alignment of the wave guide 30 with respect to the notch 24 in the cap 22. Fig. 11 illustrates a tube part after the skirt edge has been first rolled and then crimped.

What is claimed is:

1. An apparatus for angularly displacing a circular edge of an article comprising a stationary chuck to hold said article in a predetermined relation to a central axis, an annular member surrounding said article and rotatable about said central axis, a rolling tool having a shaft fixed thereto journalled for rotation and longitudinal movement along its rotated axis within an aperture formed in said annular member, the rotative axis of said shaft being disposed radially with respect to said central axis, a ring gear supported for rotation about said central axis, a cam member attached to said ring gear and having an arcuate camming surface with a gradually decreasing radius relative to said central axis, said camming surface being in engagement with one end of the shaft of said rolling tool, and means for rotating said annular member and said ring gear with a differential speed therebetween so that the changing radius of said camming surface gradually will force said rolling tool radially inward toward said central axis.

2. An apparatus for deforming the circular edge of a tubular member comprising a frame, a chuck mounted on said frame for holding said tubular member in a predetermined position with respect to a central axis, a rotatable member rotatable about said central axis, a rolling tool having an axis of rotation disposed along a radius of said rotatable member, the rolling tool being rotatably mounted on said rotatable member and movable along its own rotative axis radially with respect to said central axis, a second rotatable member rotatable about said central axis, said second rotatable member having an arcuate camming surface with a progressively changing radius with respect to said central axis, said camming surface being in engagement with one end of said rolling tool, means for rotating said rotatable members with a differential speed between them, a crimping tool movable in a direction at an angle to said movement of said rolling tool along its own axis, means associated with said frame to guide said crimping tool through said hollow member to engage said edge, and a multiple lever mechanism on said frame operatively engaging said crimping tool for applying force thereto.

3. An apparatus for bending the circular edge of a tubular member comprising a frame, a pair of parallel plates having a space therebetween and supported on said frame, a chuck secured to one of said plates for holding said tubular member with reference to a central axis, an annular member supported between said plates for rotation about said central axis, a rolling tool having a shaft rotatably mounted on said annular member and also movable along a radius of said member, a ring supported for rotation between said plates and coaxial of said annular member, said ring being provided with an arcuate camming surface having a progressively changing radius with respect to said central axis, said camming surface being in engagement with said rolling tool shaft, means to rotate said annular member and said ring at different speeds so that said rolling tool will be gradually forced radially inward toward said central axis by said camming surface while said rolling tool is being carried about said central axis.

4. An apparatus for deforming the edge of a tubular member comprising a frame, a chuck mounted on said frame for holding said tubular member with reference to a central axis, a rolling tool having a rotatable shaft and adapted to engage said edge, hollow circular means for carrying said tool around said central axis, the shaft of the rolling tool being disposed radially with respect to said central axis, means for forcing said rolling tool radially inward toward said central axis while said rolling tool is being carried about said central axis, an inverted U-shaped crimping tool, means associated with said frame to guide said crimping tool through said hollow circular means to engage said edge, and a lever fulcrumed intermediate its ends on said frame, one end of said lever engaging said crimping tool and the other end of said lever having an eccentric means for applying force to said lever.

EUGENE A. KRUSE.

REFERENCES CITED

The following references are of record in the file of this patent:

UNITED STATES PATENTS

| Number | Name | Date |
| --- | --- | --- |
| 1,493,515 | Berthold | May 13, 1924 |
| 1,548,177 | Strange | Aug. 4, 1925 |
| 1,804,284 | Smith | May 5, 1931 |
| 2,283,962 | Wilson et al. | May 26, 1942 |
| 2,290,619 | Rieger | July 21, 1942 |
| 2,342,715 | Wilson | Feb. 29, 1944 |
| 2,368,817 | Fischer | Feb. 6, 1945 |
| 2,377,829 | Vaill | June 5, 1945 |
| 2,403,998 | Pottle | July 16, 1946 |